G. TAYLOR.
MACHINE FOR TREATING VEGETABLE WASTE.
APPLICATION FILED JUNE 5, 1917.
1,335,619.
Patented Mar. 30, 1920.
6 SHEETS—SHEET 1.
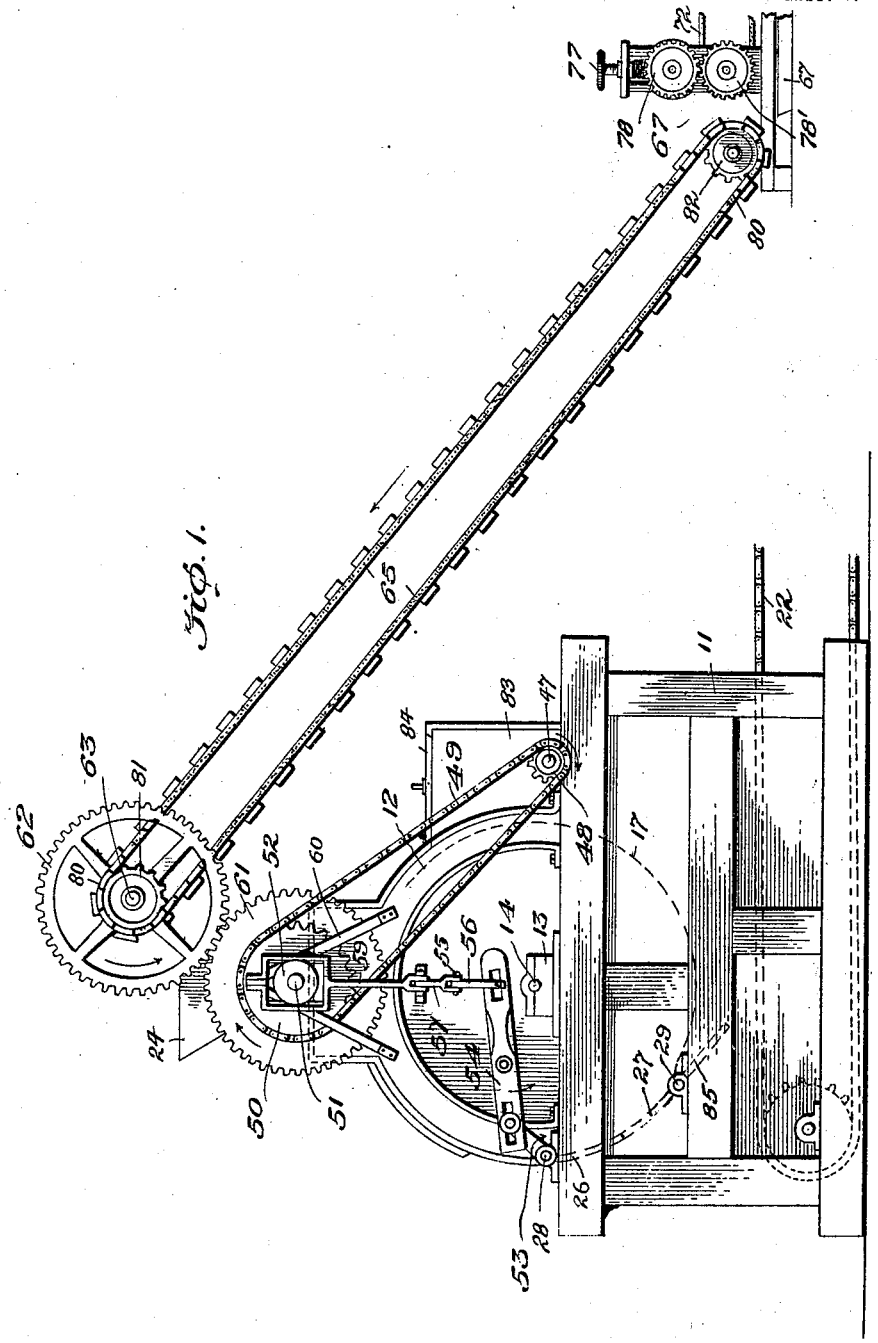
Inventor:
George Taylor
By Dodge and Sons
Attorneys G. TAYLOR.
MACHINE FOR TREATING VEGETABLE WASTE.
APPLICATION FILED JUNE 5, 1917.
1,335,619.
Patented Mar. 30, 1920.
6 SHEETS—SHEET 2.
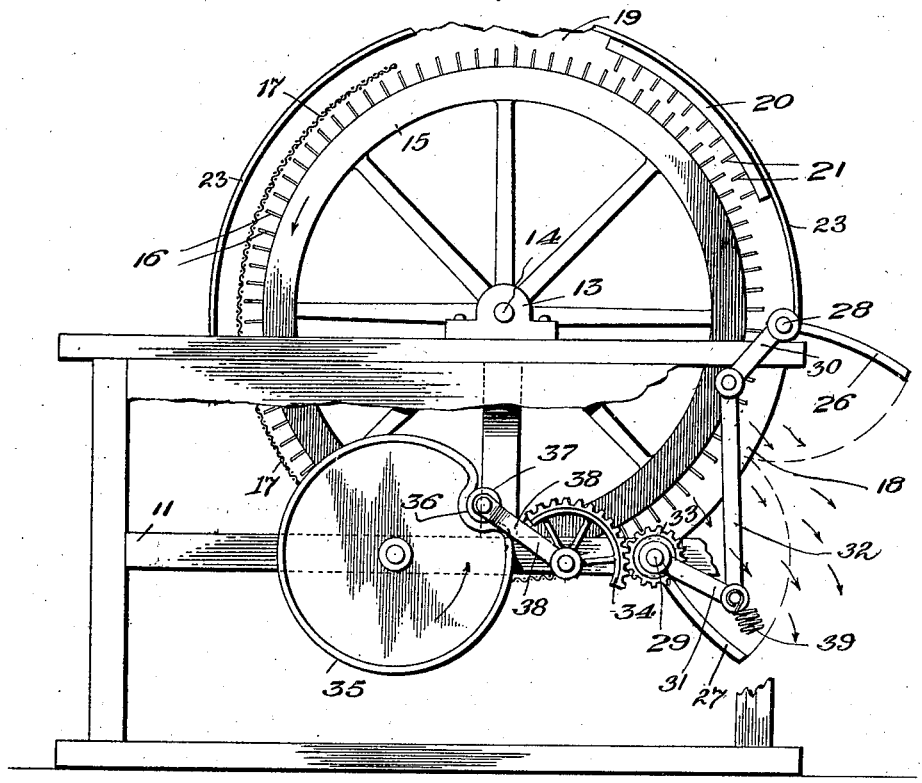
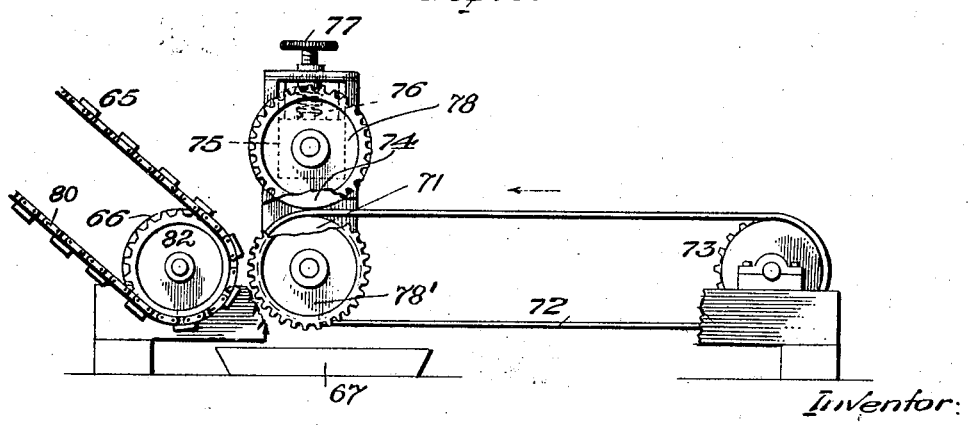

G. TAYLOR.
MACHINE FOR TREATING VEGETABLE WASTE.
APPLICATION FILED JUNE 5, 1917.
1,335,619.
Patented Mar. 30, 1920.
6 SHEETS—SHEET 4.
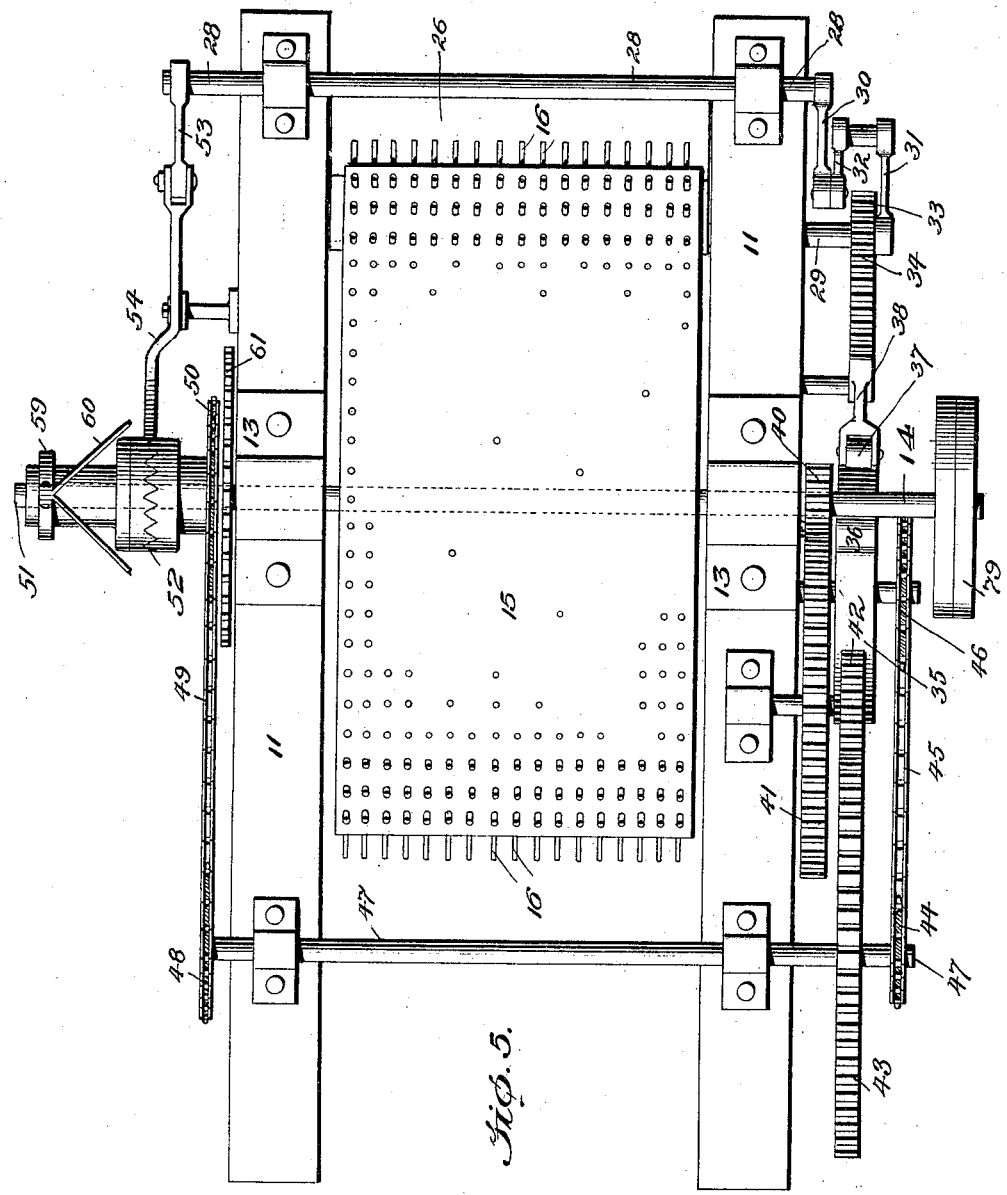

G. TAYLOR.
MACHINE FOR TREATING VEGETABLE WASTE.
APPLICATION FILED JUNE 5, 1917.
1,335,619.
Patented Mar. 30, 1920.
6 SHEETS—SHEET 5.
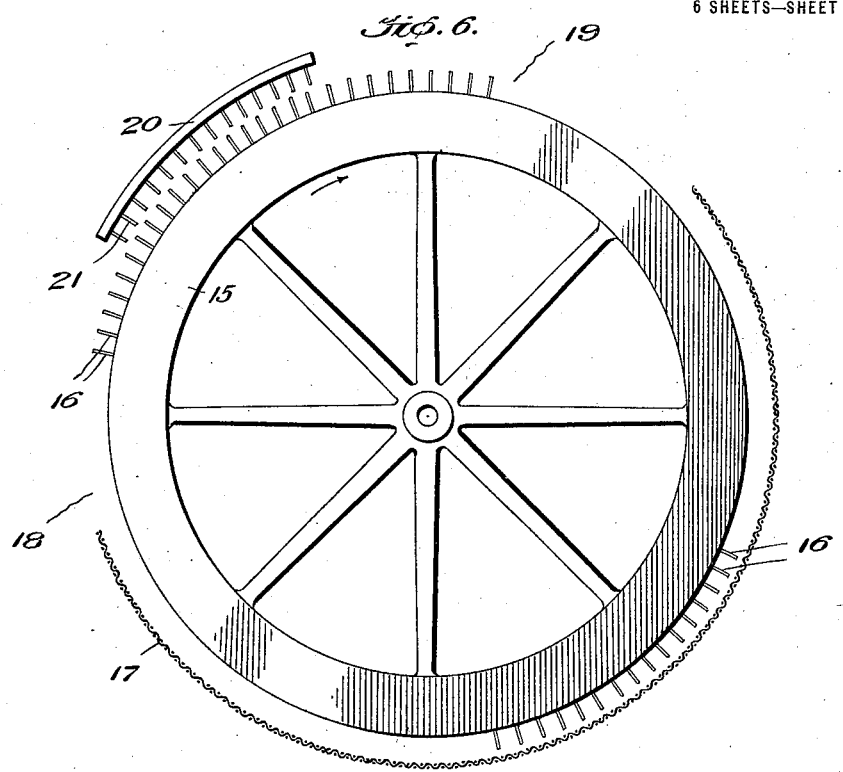
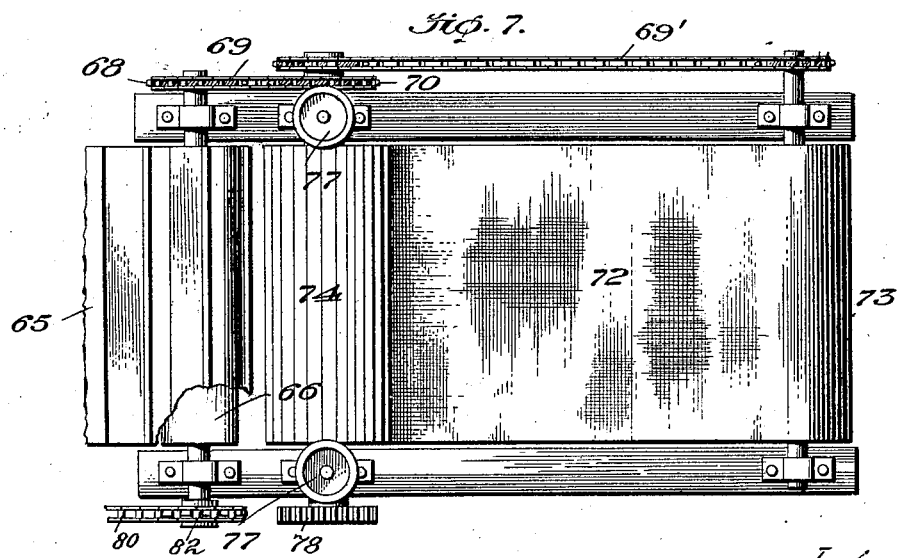
Inventor:
George Taylor
by Dodge and Sons
Attorneys G. TAYLOR.
MACHINE FOR TREATING VEGETABLE WASTE.
APPLICATION FILED JUNE 5, 1917.
1,335,619.
Patented Mar. 30, 1920.
6 SHEETS—SHEET 6.
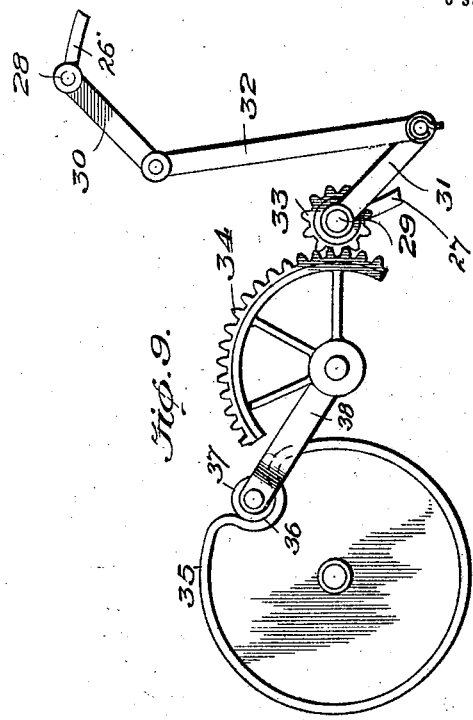
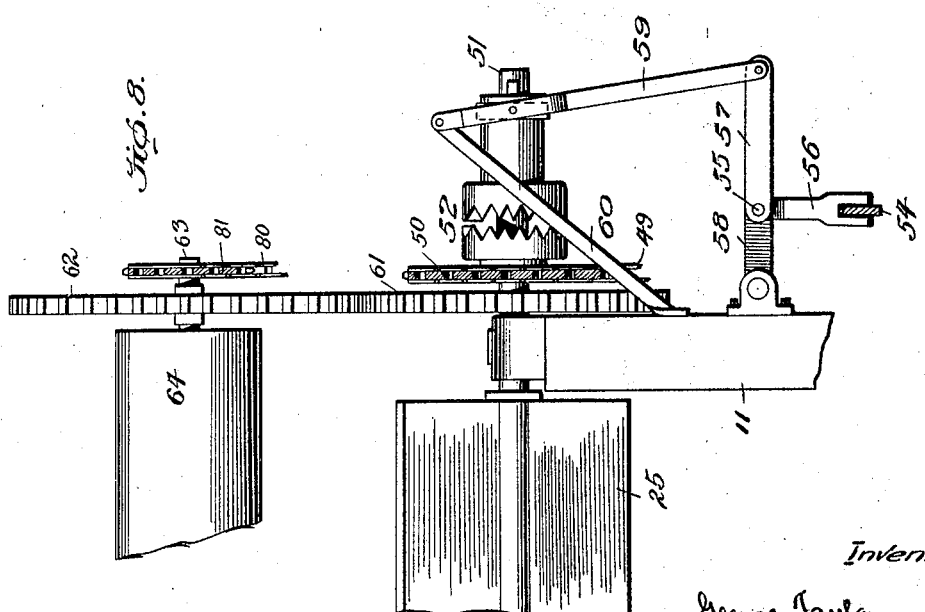
Inventor:
George Taylor,
By Dodge and Sons,
Attorneys

UNITED STATES PATENT OFFICE.

GEORGE TAYLOR, OF PHILADELPHIA, PENNSYLVANIA.

MACHINE FOR TREATING VEGETABLE WASTE.

1,335,619.  Specification of Letters Patent.  Patented Mar. 30, 1920.

Application filed June 5, 1917. Serial No. 173,069.

*To all whom it may concern:*

Be it known that I, GEORGE TAYLOR, a citizen of the United States, residing at Philadelphia, in the county of Philadelphia and State of Pennsylvania, have invented certain new and useful Improvements in Machines for Treating Vegetable Waste, of which the following is a specification.

This invention relates to a combined drying, combing and separating machine for treating vegetable wastes which contain liquid, fiber and pith in order to recover the valuable constituents.

In practically all instances where stalks and leaves are crushed to secure fiber there is a large waste product commonly called "bogasso" and this consists of a mixture of short fiber, pith and liquid. By properly separating the constituents, valuable by-products can be secured. The fiber may be variously used, one field being the manufacture of paper, the pith may be briqueted for fuel, and the liquid may be distilled to yield alcohol. In order to secure an adequate return from the by-products it is essential to provide a simple mechanical means for producing the desired separation, and the machine of the present invention performs this function. It is primarily designed for treating the sisal plant but may obviously be used for all analogous vegetable products.

Generally stated, the machine includes a wringer or squeezer for extracting the liquid from the bogasso, and a combined picking cylinder and centrifugal extractor, for combing the fiber free of the pith and discharging the pith by centrifugal force through a screen drum. A feature of the invention is the coördination of the mechanism for feeding material to the cylinder and the mechanism for discharging cleaned fiber therefrom.

A machine embodying the invention is illustrated in the accompanying drawings, in which:—

Figure 1 is a side elevation of the machine, the conveyer belt for carrying material (bogasso) to the squeezer or wringer rolls being partly broken away;

Fig. 2 is an elevation from the opposite side, with the casing and feed hopper removed. This view shows the discharge doors opened to discharge fiber;

Fig. 3 is a detail view of the squeezer rolls and feeding conveyer;

Fig. 5 is a plan view of the machine with the casing and feed hopper removed to expose the drum;

Fig. 6 is an end elevation of the drum illustrating its relation to the combing points and screen;

Fig. 7 is a plan view of the squeeze rolls and conveyers shown in Fig. 3;

Fig. 8 is a fragmentary view of the clutch and clutch actuator controlling the operation of the feed mechanism; and Fig. 9 is a detail view of the discharge-door actuating mechanism.

Figure 4:
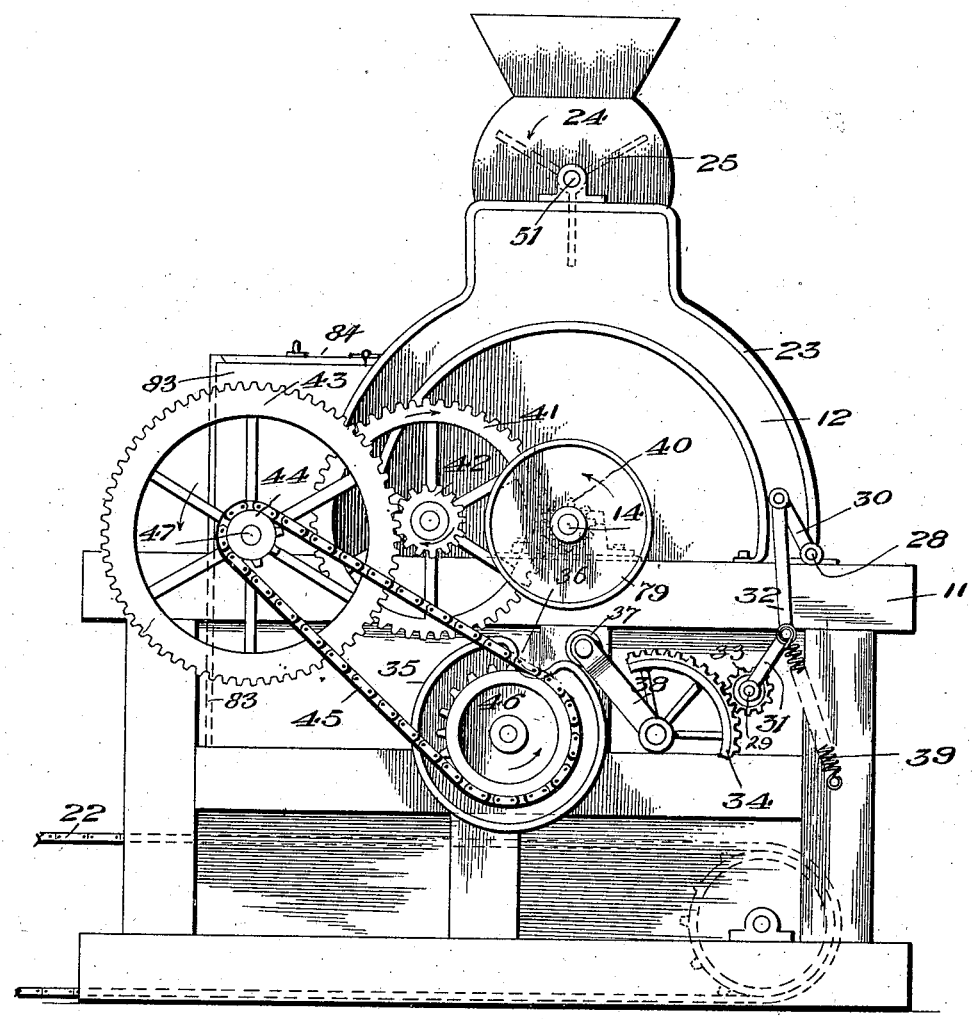
Fig. 4 is an elevation of the opposite side of the machine from that shown in Fig. 1.

The machine shown in the drawings is constructed with a timber base-frame 11 and an arcuate metallic upper frame 12. Mounted to rotate in bearings 13 on frame 11 is a shaft 14 which carries the main or rotating drum 15. This is provided over the entire peripheral surface with combing pins 16. To avoid confusion in the drawing the pins 16 are shown as rather heavier and more widely spaced than they would ordinarily be.

The drum 15 turns inside a cylindrical screen 17, which does not completely surround the drum, but extends as shown from the lower edge of the fiber discharge opening 18 to the supply opening 19 at the top of the machine. Between the supply opening 19 and the top of the fiber discharge opening 18 is mounted an arc shaped frame 20, provided with combing pins 21 which coact with pins 16 as the drum 15 rotates and serve to straighten the fiber and free the pith therefrom. The pith thus set free is thrown out through screen 17 and falling upon a moving conveyer apron 22 is carried to any suitable point (see Figs. 1 and 4). The conveyer may be driven as a part of the general machine, or separate drive means may be installed.

A semi-cylindrical housing or case 23 is mounted over the drum 15, and incloses the upper portion of screen 17 and the frame 20. At its top it carries a feed hopper 24 in which is rotatably mounted a vaned feed gate or roll 25. This gate controls the feed of material to drum 15 automatic means being provided for alternately rotating the gate and bringing it to rest at proper intervals, so that the feed shall be stopped when fiber is being discharged from the drum.

The discharge of fiber is controlled by two swinging gates 26, 27 which control opening 18 heretofore referred to. The gates are fast on shafts 28 and 29 and swing toward and from each other. Fast to shaft 28 is an arm 30 and fast to shaft 29 is an arm 31. The ends of the arms 30 and 31 are connected by a link 32, so that the gates 26 and 27 open and close together. Fast to shaft 29 is a pinion 33 which meshes with a gear sector 34. The gear sector 34 is oscillated by a cam 35 having a notch 36, the cam engaging roller 37 on an arm 38 formed integrally with sector 34. Thus once in each revolution of cam 35 the doors are allowed to open when roller 37 enters notch 36. The opening tendency is given by a tension spring 39.

The cam 35 is driven from shaft 14 by a reduction train including pinion 40, idlers 41, 42, gear 43, sprocket 44, chain 45 and sprocket 46. The gear 43 is fast on a shaft 47 which extends across the machine and carries a sprocket 48. The sprocket 48 is connected by a chain 49 to a sprocket 50 loose on shaft 51. The shaft 51 is fast to the rotary gate 25 and the sprocket 50 may be connnected to drive the shaft 51 by means of a dental clutch 52. These connections are shown in Fig. 5.

The operation of the dental clutch is controlled by the position of the discharge gates 26, 27 so that gate 25 is brought to rest by the disengagement of clutch 52 when the gates 26, 27 open. The mechanism for effecting this is best shown in Figs. 1 and 8.

The shaft 28 of gate 26 carries an arm 53 having a pin and slot connection with rock lever 54. The other end of this lever is similarly connected to a link 56 which in turn is connected to a pin 55 which forms the hinge connection between two toggle links 57, 58. These links and the parts just referred to actuate a shipper lever 59 which is pivoted at its upper end to a bracket 60, and which actuates the shifting member of the clutch 52 to perform the stated functions.

Fast on shaft 51 is a gear 61 meshing with a similar gear 62. The gear 62 is fast to shaft 63 which carries and drives a roller 64 for a conveyer belt 65, the lower bight of the belt passing around a foot roller or pulley 66.

The shaft upon which foot pulley 66 is secured carries a sprocket 68 which drives through a chain 69 a sprocket 70 secured to the shaft of roll 71. A conveyer belt 72 runs on roll 71 and a roll 73 driven through chain 69' (Fig. 7). The roll 71 is the base roll of a stand or pair of rolls forming a squeezing or wringing set. The top roll 74 of this set has vertically adjustable boxes 75 which are urged downwardly by springs 76, the springs being adjustably stressed by hand operated adjusting screws 77. The rolls 71 and 74 are constrained to turn together by gears 78, 78', and the teeth of said gears are elongated so as to permit the upper roll to be raised by the "bagasse" as it passes between the rolls and still retain the gears in mesh. Motion is imparted to the roller 66 through a sprocket drive chain 80 which passes about a sprocket wheel 81 secured to the shaft 63 and about a sprocket 82 secured upon the outer end of the shaft upon which the roller 66 is secured. Underneath the rollers is a receptacle 67 to gather the liquid expressed from the material and from which receptacle it may be fed to any desired place.

As will be seen more particularly upon reference to Figs. 1 and 4, the frame of the machine is extended outwardly to the right, as indicated at 83 and is provided with a door 84 in the upper portion thereof, this door being utilized for the purpose of cleaning out the machine. A deflector 85 (see Fig. 1) is located below the doors 26 and 27 and tends with the downwardly extending wall of the extension 83, to deflect the pith directly upon the conveyer apron 22 which passes below.

The rolls 71 and 74 start and stop with the conveyer 65 and gate 25, so that an even feed to the carding separator is secured. Power may be applied to the machine at any suitable point but I show a driving belt pulley 79 attached to shaft 14 (Fig. 5) for this purpose, the entire machine being driven from this shaft.

The "bagasse" or any material containing fiber, pith and liquid to be separated is placed upon the apron 72 and carried thereby between the rolls 71 and 74, where the material is crushed or squeezed and the liquid is wrung therefrom to a greater or less extent. Such liquid flows into the receptacle 67 above referred to. The remaining material passes from the belt 72 to the conveyer belt 65, is carried upwardly thereby, and is deposited into the hopper or receptacle 24. The gate 25 periodically discharges the material from the hopper to the rotating drum 15 which turning at a high speed combs or beats the fiber free of the pith, the pith being thrown out through the screen. After a definite number of turns of the drum the gates 26, 27 automatically open to discharge the cleaned fiber, the feed to the drum and the squeezing and conveying devices being automatically brought to rest during the discharging action. This is effected by the roller 37 dropping into the notch 36, of the cam 35, which cam makes but one revolution for a number of revolutions of the drum. At the same time that the doors are being opened the feed mechanism is thrown out of action through the disengagement of the clutch 52 which clutch is brought to its disengaged position by the straightening of the toggle elements 57, 58 which is effected, as above set forth, through the swinging of the lever 54.

Having thus described my invention what I claim is:—

An organized machine for breaking up and separating the fibrous, pulpy and liquid constituents of vegetable matter, comprising in combination, a casing; a screen and a fixed combing element mounted in said casing; a combing drum, mounted to rotate within said screen in coöperative relation with said fixed combing element; driving connections for said drum; a discharge door controlling the discharge of fibrous material from within said screen; a cam driven by the driving connections for the drum operatively related to said door to open and close the latter; mechanical feeding means for delivering material to said screen; liquid-extracting press-rolls adapted to deliver solid material, pressed thereby, to said feeding means; driving connections, including a releasable clutch, for driving said rolls and feeding means from the driving connections for the drum; means operable by the opening and closing movements of said door for releasing and engaging said clutch; means for collecting liquid extracted by said rolls; and a conveyer for collecting and removing pulp passing through said screen.

In testimony whereof I have signed my name to this specification.

GEORGE TAYLOR.